Sept. 30, 1947.　　R. S. CURRY, JR., ET AL　　2,428,014
CONCENTRIC CORE FLUX VALVE
Filed Feb. 3, 1943　　3 Sheets-Sheet 1
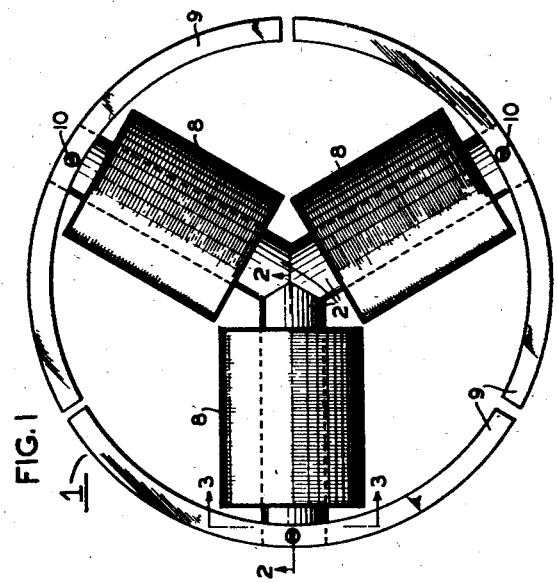
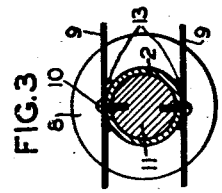
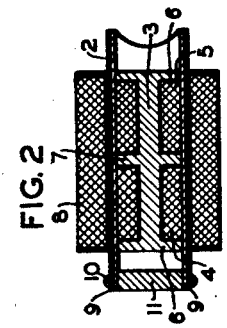
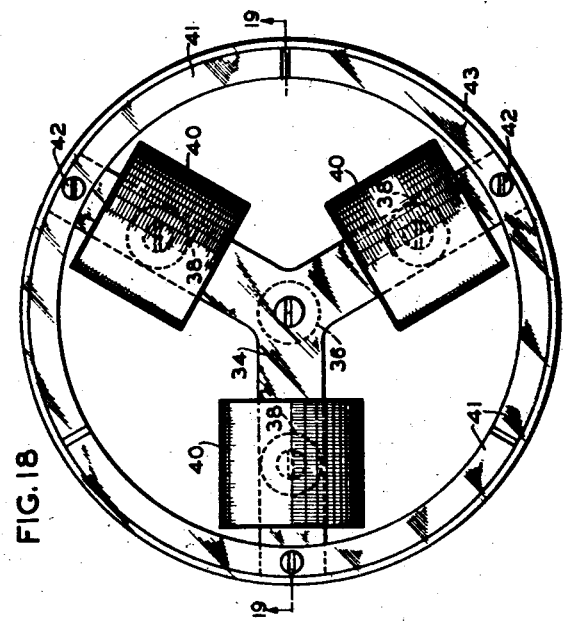
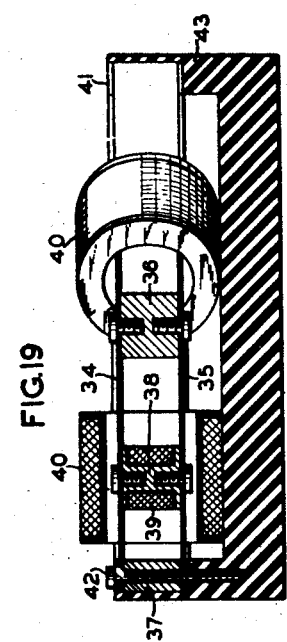
INVENTORS:
R. S. CURRY JR.
C. F. FRAGOLA
BY
Herbert H. Thompson
THEIR ATTORNEY Sept. 30, 1947. R. S. CURRY, JR., ET AL 2,428,014
CONCENTRIC CORE FLUX VALVE
Filed Feb. 3, 1943 3 Sheets-Sheet 2

INVENTORS:
R. S. CURRY, JR.
C. F. FRAGOLA
BY Herbert H. Thompson
THEIR ATTORNEY

INVENTORS:
R. S. CURRY, JR.
C. F. FRAGOLA
BY Herbert H. Thompson
THEIR ATTORNEY

Patented Sept. 30, 1947

2,428,014

UNITED STATES PATENT OFFICE 2,428,014

CONCENTRIC CORE FLUX VALVE

Robert S. Curry, Jr., Baldwin, and Caesar F. Fragola, Brooklyn, N. Y., assignors to Sperry Gyroscope Company, Inc., Brooklyn, N. Y., a corporation of New York Application February 3, 1943, Serial No. 474,622

18 Claims. (Cl. 177—380)

Flux valves, which essentially comprise a core of highly permeable magnetic material, an exciting winding for producing a pulsating flux therein, whereby to bring the core substantially into a state of saturation, and a secondary or pick-up coil, are sensitive to an external unidirectional magnetic field, such as the earth's field, to produce output E. M. F.'s which vary both in magnitude and phase as the position of the axis of the core is varied angularly with respect to the direction of the external field. Because the core of these valves is brought near the saturation point of the magnetic material in order to render the device sensitive, leakage of the flux occurs and produces in the secondary or pick-up coil a signal having the frequency of that of the source of energy for the exciting winding and also troublesome harmonics thereof, which mainly, are of an odd order.

It is an object of our invention to provide a flux valve which is so constructed and arranged as to reduce the troublesome fundamental and harmonic frequencies in the signal output substantially to a minimum value.

More particularly, it is an object of our invention to so arrange the core of a flux valve as to substantially isolate the pick-up coil from the flux produced by the exciting coil in the core.

It is a still further object to provide a flux valve comprising concentric core portions or core portions arranged symmetrically about an axis thereof and in which the exciting coil is disposed between said core portions, and the pick-up coil surrounds the outer core.

A still further object resides in providing a flux valve having a core of the foregoing character in which the outer core is substantially cylindrical in form and concentric with the inner core.

Another object resides in providing a flux valve having concentric cores of the above character and in which the exciting winding provides fluxes flowing for any instantaneous value thereof in opposite directions lengthwise of the outer core.

A still further object resides in providing a flux valve in which the parts thereof are concentrically arranged and the flux flows in opposite directions for any instantaneous value thereof in the core, said flux valve including shunt means for controlling the distribution or path of flow of said flux laterally of the core and intermediate the ends thereof whereby balancing of the E. M. F.'s induced in the pick-up coil by said opposing fluxes may be effected.

Another object resides in providing a flux valve so designed as substantially to eliminate linkage of leakage flux with the pick-up coil and its attendant undesired effects in the output of the flux valve, and which may be readily and cheaply manufactured and is susceptible to manual adjustment.

With the foregoing and other objects in view, our invention includes the novel elements and the relative arrangements thereof described below and illustrated in the accompanying drawings, in which:

Fig. 1 is a plan view of a three-legged flux valve embodying one form of our invention.

Fig. 2 is a sectional view through one of the core legs of Fig. 1 and taken in about the plane 2—2 thereof.

Fig. 3 is a section taken transversely of one of the core legs of Fig. 1 in about the plane 3—3 thereof.

Figure 10:
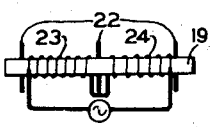
Figure 11:
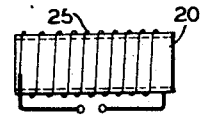

Figs. 10 and 11 diagrammatically illustrate, respectively, the relationship of the primary and secondary windings with the inner and outer core members.

Figure 8:
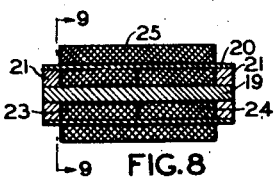
Fig. 8 is a longitudinal section taken through another modified form of flux valve.
Figure 12:
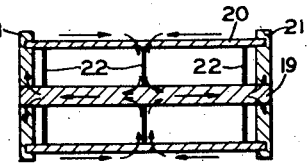

Fig. 12 diagrammatically illustrates the magnetic circuit for the flux valve of Fig. 8.

Figure 13:
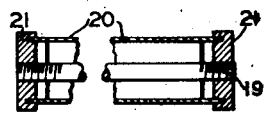

Fig. 13 is a fragmentary, longitudinal sectional view through a flux valve assembly illustrating a means for relatively adjusting the inner core and exciting winding with respect to the outer or pick-up winding.

Figure 14:
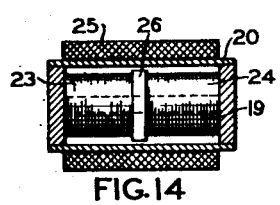

Fig. 14 is an elevation view partially in section of a further modification showing an adjustable shunt for controlling the path of flow of the magnetic flux.

Figure 15:
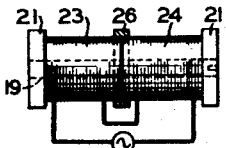

Fig. 15 is an elevation, detail view of the valve of Fig. 14.

Figure 16:
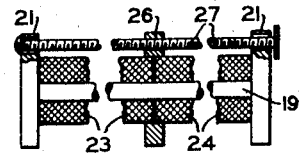

Fig. 16 discloses a means for adjusting the shunt of Fig. 14.

Figure 17:
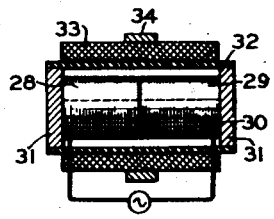

Fig. 17 shows a still further modified arrangement for the flux controlling shunt.

Fig. 18 is a plan view of a still further modified form of flux valve.

Fig. 19 is a vertical section taken in about the plane 19—19 of Fig. 18.

Figure 20:
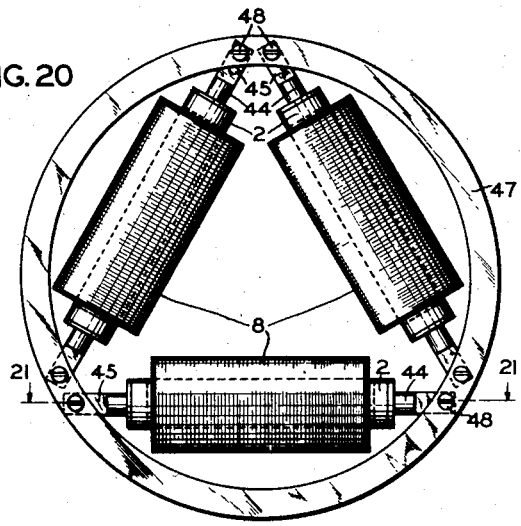

Fig. 20 is a plan view of a modified relative arrangement of core legs or flux valves in forming a unit.

Figure 21:
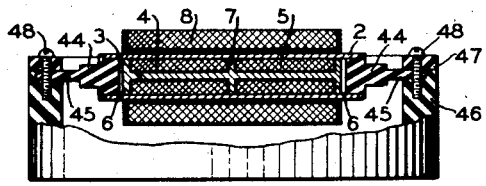
Figure 22:
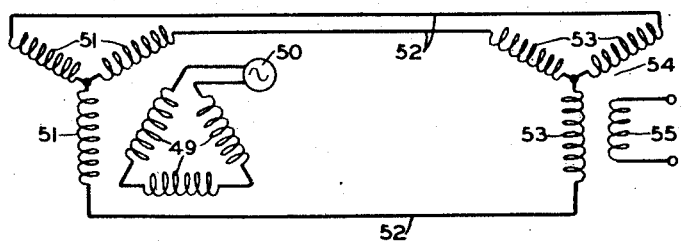

Fig. 21 is a sectional elevation thereof taken in about the plane 21—21 of Fig. 20; and Fig. 22 illustrates one manner of electrically connecting the exciting windings and pick-up coils, respectively.

It has been determined that the highly permeable magnetic core of a flux valve where it is to be brought substantially into a state of high degree of saturation, and the core, and preferably all of the valve parts, is substantially symmetrical in design with respect to one or more of its axes, that the leakage flux will be symmetrical and therefore it will not effectively link with the pick-up coil. Furthermore, as in our present invention, where a tubular magnetic core lies between an inner magnetic core and a pick-up coil and magnetic saturation to a high degree is produced in the outer, tubular core, the tubular core acts as a shield with a minimum of flux leakage occurring therefrom.

Figure 4:
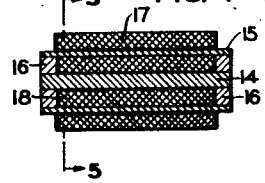
Fig. 4 is a longitudinal sectional view through a modified flux valve which may be employed as one of the legs of a multi-legged flux valve.

Therefore, as illustrated in Figs. 1 through 3, we have provided a flux valve indicated generally at 1, with leg portions 2, which are in the form of tubular or preferably cylindrical sections of highly permeable magnetic material. An inner core 3 of permeable magnetic material is adapted to be received within the cylindrical or tubular core members 2 and carries exciting coils 4 and 5. In this embodiment, coils 4 and 5 are designed to circulate flux through both the inner core 3 and outer core 2 in opposite directions for any instantaneous value thereof. However, a single coil such as that shown in Fig. 4 may conceivably be employed. The inner core 3 comprises end shunts 6 and center shunt 7, which are adapted to engage the outer core 2 to provide a substantially continuous path for the circulation of flux thereabout. For example, for any instantaneous value, the flux will flow from the core 3 in both directions toward the end shunts 6, then outwardly to the outer core 2 and then in a reverse direction through the outer core and back through the center shunt 7 of the inner core.

A secondary or pick-up coil 8 surrounds the outer core 2 and may be fastened in the position illustrated by any suitable means. Each of the three core legs illustrated in Fig. 1 may be formed in the foregoing manner and fastened together at the center of the valve in any suitable way as by soldering or welding, or, an air space may be left at their adjacent ends, the core legs being disconnected. In the embodiment shown, collector rings 9 are associated with each core leg and may be fastened thereto by means of studs 10, which pass through the walls of the outer core 2 adjacent its outer end and engage a spacer 11 within the core. Blocks 13, as shown in Fig. 3, may be interposed between the collector rings and the core to provide a firm connection therebetween.

In operation, the core 2 and core 3 become highly saturated or partially saturated by the pulsating or alternating flux produced therein by the exciting windings 4 and 5 which are adapted to be connected to an alternating or pulsating source of electrical energy. Since the outer core 2 is of cylindrical form and is concentrically and therefore symmetrically arranged with respect to the inner core 3, substantially none of the flux therein will link with the pick-up winding 8. In other words, by virtue of the symmetrical and concentric core relationship, the flux will experience hardly any tendency to leak out of the path provided by the outer core and, hence, substantially no signal of fundamental frequency or of a frequency corresponding to that of the source of energy exciting the coils 4 and 5, and substantially none of its undesirable odd harmonics, will appear in the output from coil 8.

The exciting coils in the three legs of the valve may be series connected across a source of pulsating current, and the pick-up coils may be connected in polycircuit.

In the modifications of our invention illustrated in Figs. 5 through 17, inclusive, we have shown flux valves which may be employed in forming multi-legged flux valve units or which may be mounted as isolated parts of a unit but in relative angular relationships, such as the angular relationship of the legs of Fig. 1.

Figure 5:
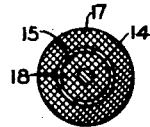
Fig. 5 is a transverse sectional view taken in about the plane 5—5 of Fig. 4.
Figure 6:
Fig. 6 illustrates more or less diagrammatically the relation of coils to core members of the valve of Fig. 4.
Figure 7:
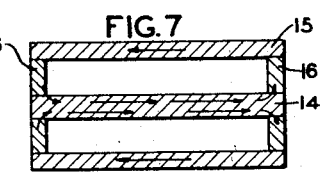
Fig. 7 illustrates diagrammatically the magnetic circuit through the core of the valve of Fig. 4.
Figure 9:
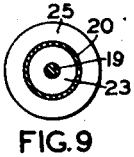
Fig. 9 is a transverse section taken in about the plane 9—9 thereof.

The embodiment disclosed in Figs. 5 through 7, comprises an inner core 14 and an outer core 15 arranged in concentric relationship. The outer core 15 is preferably cylindrical in form. End shunts 16, which, with a cylindrical outer core, are substantially disc-shaped, are provided adjacent opposite ends of the cores and form paths for the flow of flux between the inner and outer cores. A pick-up coil 17 surrounds the outer core, as shown, and an exciting or primary coil 18 is disposed about the inner core 14 and within the outer core 15. The arrangement of coil windings is diagrammatically shown in Fig. 6 and the magnetic circuit provided by the cores and end shunts as a unit, is illustrated in Fig. 7.

It will be noted that since, in this embodiment, the exciting coil comprises a single continuous winding in one direction about the inner core 14, flux will flow through the inner and outer cores and end shunts for any instantaneous value thereof, as represented by the arrows in Fig. 7. In practice, the exciting coil is connected to a source of pulsating or alternating current which serves alternately to saturate the magnetic core first in one direction and then in the other, the flux tending to remain within the outer core rather than to leak out and link with the pick-up coil wound thereabout. Hence, as described in connection with the flux valve of Fig. 1, substantially no E. M. F. will be induced in the pick-up coil which corresponds in frequency to that of the current source for the exciting winding or any odd or troublesome harmonics thereof.

A further modification is shown in Figs. 9 through 12 wherein the concentric and symmetrical core arrangement of the above-described flux valve is provided, the magnetic core including the inner core 19, outer, preferably cylindrical core or tube 20 and end shunts 21. In this embodiment, however, spacing discs 22 of insulating material, such as fish paper, are mounted on the inner core 19 and the exciting windings 23 and 24 are wound directly on the core and between the spacing discs. The central disc 22, between the two exciting coils, may be formed of magnetic material. These coils are wound and connected to provide fluxes which will oppose each other both in the inner and outer core, as represented by the arrows in Fig. 12. The pick-up coil 25 is disposed about the outer core 20 substantially in the same manner as described in connection with Fig. 4.

In this latter embodiment of our invention, the arrangement of the core provides for substantially minimum flux leakage, and due to the opposing relationship of the fluxes in the core for any instantaneous value thereof, any potentials which may be induced in the pick-up coil by the leakage flux and which are of the same frequency as that of the source of current for the exciting coils, or any odd harmonic thereof, will tend to cancel out in the pick-up coil.

To provide for more accurate positioning of the exciting coils relative to the pick-up coil whereby more closely to balance the opposing potentials induced in the secondary or pick-up coil from the leakage flux linked therewith, we provide for relative axial adjustment of the exciting and pick-up coils. One means of effecting this adjustment is disclosed in Fig. 13 wherein the inner core 19 is threaded through the end shunts 21 and one end is provided with a slot whereby to permit rotation thereof. The outer, tubular core 20 is fastened to the end shunts 21 to provide a unitary, outer core structure relative to which the inner core 19 may be moved in an axial direction to vary the position of the exciting coils carried thereby relative to the pick-up coil on the outer core.

In Figs. 14 and 15, we have illustrated a further modification of the flux valve arrangement shown in Fig. 8. In this modification, a magnetic shunt 26, preferably annular in shape, is mounted to surround the exciting coils and to lie in the zone about the adjacent ends of these coils. For example, the shunt 26 may be mounted directly upon the insulating covering for the exciting coils and is adapted to be moved axially thereof whereby to control the distribution of the flux or the path of the flux as it passes between the cores in the zone of said shunt. The shunt 26 is disposed within the outer core 20 and may be shifted axially thereof to control the relationship of any leakage flux to the pick-up coil 25. In this manner, the shunt 26 may be adjusted to provide substantially equal and opposite induced potentials in the pick-up coil, assuming the presence thereof, which are of the frequency of the exciting current in the exciting coils or odd harmonics thereof.

In Fig. 16, we have disclosed one means of effecting an axial adjustment of the shunt 26. A threaded rod 27, preferably of non-magnetic material such as Bakelite, passes through the end shunts 21 and engages a threaded opening in shunt 26, rod 27 passing freely through end shunts and being provided with a knurled head at one end while being peened over at the other. By turning the rod 27 in one direction or the other, axial adjustment of the shunt 26 is effected.

Fig. 17 illustrates a still further modification of our flux valve wherein an annular shunt is provided to control the linkage of the opposing fluxes with the secondary or pick-up coil. Exciting coils 28 and 29 are mounted upon the core 30 and between the end shunts 31 substantially in the manner hereinbefore described, the coils 28 and 29 being so connected as to provide opposing fluxes in the core for any instantaneous value thereof. An insulating or non-magnetic, tubular element 32 may be mounted over the end shunts 31 to support a pick-up coil 33. A magnetic shunt 34 surrounds the entire structure and serves to control the distribution and the linkage of the opposing fluxes with the pick-up coil. Preferably, of course, the insulating element or sleeve 32 is cylindrical in form and shunt 24 is preferably annular and adapted slidably to fit over the pick-up coil 33.

Figs. 18 and 19 illustrate a still further modified form of flux valve and a casing for supporting the magnetic core legs thereof which may also be employed as a mounting for the flux valve of Fig. 1. In this form of our invention, the three flux valve legs comprise upper and lower spaced laminations 34 and 35 of highly permeable magnetic material, each lamination preferably forming, as an integral unit, the upper or lower lamination of all the legs. Centrally, these laminations are spaced by a spacer 36 and the ends of the legs are separated by spacers 37, the spacers 36 and 37 being preferably of magnetic material but they may be of non-magnetic material. Between the laminations 34 and 35 and intermediate the lengths of the leg portions thereof is disposed a core 38 having an exciting winding 39 wound thereabout and being disposed with its axis substantially normal to the leg laminations 34 and 35. An exciting coil is mounted in this manner between the leg laminations in each leg of the flux valve, as shown in Fig. 18, and pick-up coils 40 are mounted upon each leg of the flux valve and surround both the upper and lower lamination 34 and 35 of each leg. The position of the pick-up coils may be adjusted axially of each leg to provide a minimum of undesired, induced E. M. F.'s therein, as hereinbefore explained, and when so properly positioned may be secured in place in any suitable manner.

In the embodiment illustrated, collector rings 41 are fastened to the ends of the core legs of the flux valves by means of studs 42 which, as shown in Fig. 19, may be also employed in fastening the core laminations to the spacers 37 and in fastening all of the magnetic circuit parts of the flux valve to the base or support 43 of insulating material.

The flux produced in the core legs of this latter embodiment of our invention will flow from the cores 38 for the exciting winding, for one instantaneous value thereof, through the lower laminations 35, for example, toward the central spacer 36 and toward the outer spacer 37, through these spacers and thence back through the upper laminations 34 to the cores 38. Any leakage flux which may link with the pick-up coils 40 will produce unwanted E. M. F.'s therein and adjustment of the pick-up coils axially of the core legs will permit balancing out of these E. M. F.'s.

Balancing of the opposing and unwanted E. M. F.'s may be obtained in the modification of Fig. 1 and in all other modifications where opposing fluxes are generated in the cores by varying the relative positions of pick-up and exciting coils axially of the cores as hereinbefore explained. In all cases, threaded adjusting means may be provided positively to move and position one or the other of said coils, or any suitable means may be employed for holding the coils in adjusted position.

In the normal operation of a flux valve, the signal output from the pick-up coils thereof varies in magnitude and phase with changes of the position of the axis of the coil angularly with respect to an external unidirectional magnetic field, and the frequency of this signal will be double that of the source of periodically varying electrical energy employed in energizing the exciting windings of the flux valve. Since a signal of undistorted wave form is desired, any induced E. M. F.'s in the pick-up coils which are of fundamental frequency corresponding to the frequency of said source and any odd harmonic thereof, should be entirely absent. The concentric and symmetrical arrangement of the parts of our flux valve, as herein described, not only reduce these unwanted E. M. F.'s in the output coils to a minimum but also afford a means of balancing the exciting and pick-up coil relationship so that, if any induced E. M. F.'s of undesired frequencies should be present, they will be further eliminated through cancellation thereof one by the other.

In Figs. 20 and 21, we have illustrated a modified relative arrangement of the legs of a flux valve unit and one in which the legs are positioned in the form of and to lie along the sides of a triangular frame. The structure of each leg thereof may conform to any of the various embodiments of our invention disclosed in Figs. 5 through 17 but, for purposes of illustration, we have shown the form illustrated in Fig. 2. Each leg of the flux valve comprises a tubular core 2 within which is disposed the inner core 3 having end shunts 6 and central shunt 7, these parts being preferably of high permeable magnetic material as hereinbefore explained. The exciting windings 4 and 5 are disposed within the tubular core 2 and about the inner core 3 while the pick-up coil 8 surrounds the tubular core 2. By relatively arranging the flux valve legs as illustrated and with the ends of the cores 2 thereof adjacent each other at the apexes of the triangle, formed by the flux legs, no collector horns or rings are necessary since the adjacent units function as collectors of the flux of the external magnetic field for each other.

In the embodiment shown, the flux valve legs are supported by means of plugs 44 of insulating material which are inserted in the ends of the tubular core and provided with flattened ends 45 which are adapted to bear upon an annular shoulder of the insulating base support 46. The insulating ring 47 serves in connection with screws 48, which pass through the flattened ends of the plugs 44 and into the base 46, to complete the assembly.

In Fig. 22, we have illustrated an exemplary wiring diagram which serves to illustrate one manner in which a flux valve embodying any of the modifications herein disclosed may be connected to a receiving device. The exciting windings 49 of the respective legs of the flux valve are energized from a suitable source of pulsating or alternating current 50. Each winding 49 may consist of a single exciting winding or two exciting windings connected together to provide opposing fluxes in the core of the valve. The pick-up coils 51 are here illustrated as Y-connected and through conductors 52 are connected to the Y-connected, polycircuit winding 53 of the receiver 54. If the receiver 54 is embodied in a repeater compass, the single phase winding 55 thereof will be connected to a source of alternating current having twice the frequency of that of the source indicated at 50 in order that the receiver may be phase sensitive. The frequency of the energy source for coil 55 should be double that of the source 50 because the output of the flux valve will have a frequency which is double that of the source of energy employed in energizing the exciting windings thereof. On the other hand, the receiver 54 may be used as a signal transformer in which case coil 55 provides an output. The flux valve and signal transformer system may be utilized, for example, in controlling a directional gyro and for correcting for wandering thereof from a predetermined position in azimuth.

It is to be understood that where we have referred to pulsating and periodically varying exciting currents or flux in the foregoing description and appended claims, we mean to include a flux or current of a pulsating or a periodically flowing, undirectional nature and those of an alternating nature periodically reversing in their direction of flow.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A flux valve sensitive to an external unidirectional magnetic field for supplying signal voltage outputs dependent in magnitude on the direction of said field relative thereto, said flux valve comprising concentrically arranged, inner and outer core members of permeable magnetic material, an exciting coil encircling said inner core and within the outer core and adapted to be connected to a source of pulsating electrical energy to produce a pulsating flux in said core members, and a pickup coil encircling said outer core member and lying wholly exterior thereto.

2. A flux valve sensitive to an external unidirectional magnetic field for supplying signal voltage outputs dependent in magnitude on the direction of said field relative thereto, said flux valve comprising concentrically arranged, inner and outer core members of permeable magnetic material, an exciting coil encircling said inner core in immediate adjacency thereto and within the outer core and adapted to be connected to a source of pulsating electrical energy to produce a pulsating flux in said core members, a magnetic shunt associated with said core members and disposed adjacent each end thereof and forming paths for the flow of flux between inner and outer core members, and a pick-up coil encircling said outer core member and lying wholly exterior thereto.

3. A flux valve sensitive to an external unidirection magnetic field for supplying signal voltage outputs dependent in magnitude on the direction of said field relative thereto, said flux valve comprising concentrically arranged, inner and outer core members of permeable magnetic material, the outer core member being tubular in form, an exciting coil encircling said inner core and within the outer core and adapted to be connected to a source of pulsating electrical energy to produce a pulsating flux in said core members, and a pickup coil encircling said outer core member and lying wholly exterior thereto.

4. A flux valve sensitive to an external unidirectional magnetic field for supplying signal voltage outputs dependent in magnitude on the direction of said field relative thereto, said flux valve comprising concentrically arranged, inner and outer cores of permeable magnetic material, the outer core being cylindrical in form, an exciting coil encircling said inner core in immediate adjacency thereto and within said outer core and adapted to be connected to a source of pulsating electrical energy to produce a pulsating flux in said cores, and a pick-up coil surrounding said outer, cylindrical core and lying wholly exterior thereto.

5. A flux valve sensitive to an external unidirectional magnetic field for supplying signal voltage outputs dependent in magnitude on the direction of said field relative thereto, said flux valve comprising concentrically arranged, inner and outer cores of permeable magnetic material, the outer core being cylindrical in form, an exciting coil encircling said inner core in immediate adjacency thereto and within said outer core and adapted to be connected to a source of pulsating electrical energy to produce a pulsating flux in said cores, substantially disc-shaped shunts connecting said outer and inner cores adjacent the ends thereof and forming paths for the flow of flux therebetween, and a pick-up coil surrounding said outer core and lying wholly exterior thereto.

6. A flux valve comprising concentrically arranged, inner and outer cores of permeable magnetic material, a pair of exciting coils disposed about said inner core and within the outer core and connected together to produce opposing fluxes in said cores when connected to a source of pulsating electrical energy, and a pick-up coil surrounding said outer core.

7. A flux valve comprising concentrically arranged, inner and outer cores of permeable magnetic material, a pair of exciting coils disposed about said inner core and within the outer core and connected together to produce opposing fluxes in said cores when connected to a source of pulsating electrical energy, magnetic shunts associated with said inner and outer cores adjacent the ends of said pair of exciting coils to form paths for the flow of flux between said cores, and a pick-up coil surrounding said outer core.

8. A flux valve comprising a core of permeable magnetic material having laterally extending shunts adjacent both ends thereof, a pair of exciting coils disposed about said core and connected to produce opposing fluxes for any instantaneous value thereof when connected to a source of pulsating electrical energy, a pick-up coil surrounding said exciting coils, and a shunt of magnetic material extending about and in substantially concentric relation to the longitudinal axis of said core.

9. A flux valve comprising concentrically arranged, inner and outer cores of permeable magnetic material, a pair of exciting coils disposed about said inner core and within the outer core and connected together to produce opposing fluxes in said cores when connected to a source of pulsating electrical energy, magnetic shunts associated with said inner and outer core members adjacent the ends thereof and forming paths for the flow of flux therebetween, a magnetic shunt disposed within said outer core and intermediate the length thereof, and a pick-up coil surrounding said outer core member.

10. A flux valve comprising concentrically arranged, inner and outer cores of permeable magnetic material, a pair of exciting coils disposed about said inner core and within the outer core and connected together to produce opposing fluxes in said cores when connected to a source of pulsating electrical energy, magnetic shunts associated with said inner and outer core members adjacent the ends thereof and forming paths for the flow of flux therebetween, an annular shunt of magnetic material movably supported within said outer core, and a pick-up coil surrounding said outer core.

11. A flux valve comprising concentrically arranged, inner and outer cores of permeable magnetic material, the outer core being cylindrical in form, a pair of exciting coils disposed about said inner core and within said outer core and connected together to produce opposing fluxes in said cores when connected to a source of pulsating electrical energy, magnetic shunts associated with said inner and outer core adjacent opposite ends of said pair of exciting coils to form paths for the flow of flux between said cores, an annular shunt of magnetic material disposed about said exciting coils and within said outer core, and a pick-up coil surrounding said outer core.

12. A flux valve comprising concentrically arranged, inner and outer cores of permeable magnetic material, a pair of exciting coils disposed about said inner core and within the outer core and connected together to produce opposing fluxes in said cores when connected to a source of pulsating electrical energy, magnetic shunts associated with said inner and outer core members adjacent the ends thereof and forming paths for the flow of flux therebetween, a magnetic shunt movably arranged within said outer core and extending about the interior thereof, a pick-up coil surrounding said outer core, and means for moving said movable shunt axially of said cores.

13. A flux valve comprising concentrically arranged, inner and outer cores of permeable magnetic material, a pair of exciting coils disposed about said inner core and within the outer core and connected together to produce opposing fluxes in said cores when connected to a source of pulsating electrical energy, a pick-up coil surrounding said outer core, and means for effecting relative axial movement between said inner, exciting coils and said outer, pick-up coil.

14. A flux valve comprising concentrically arranged inner and outer cores of permeable magnetic material having laterally extending shunts adjacent both ends thereof, a pair of exciting coils disposed about the inner core and connected to produce opposing fluxes for any instantaneous value thereof when connected to a source of pulsating electrical energy, a pick-up coil surrounding said exciting coils, and means for controlling the direction of the flux flow in the zone of the adjacent ends of said exciting coils.

15. A flux valve comprising a core of permeable magnetic material having portions thereof spaced laterally from each other, coil means and a core therefor disposed between said core portions for producing, when connected to a source of periodically varying electrical energy, periodically varying fluxes in said core portions flowing in each portion simultaneously in opposite directions and in bucking relation, and a pick-up coil surrounding said spaced core portions.

16. A flux valve sensitive to an external unidirectional magnetic field for supplying signal voltage outputs of a frequency twice that of the flux employed in exciting said valve and dependent in magnitude on the direction of said field relative thereto, said flux valve consisting of, as the sole essential elements required to provide said signal voltage outputs, an inner core and a generally tubular, outer core member both of permeable magnetic material and concentrically arranged, means for inducing a periodically varying flux in said core members, and a pick-up coil surrounding the outer core member.

17. A flux valve sensitive to an external unidirectional magnetic field for supplying signal voltage outputs of a frequency twice that of the flux employed in exciting said valve and dependent in magnitude on the direction of said field relative thereto, said flux valve consisting of, as the sole essential element required to provide said signal voltage outputs, concentrically arranged inner and a generally tubular outer core member of permeable magnetic material connected together to provide a closed magnetic circuit, means for inducing a periodically varying flux in said core members, and a pick-up coil surrounding the outer core member.

18. A flux valve of the character recited in claim 6, further characterized by the fact that said exciting coils, as a unit, and said pick-up coils are relatively movable axially of said cores.

ROBERT S. CURRY, JR.
CAESAR F. FRAGOLA.

REFERENCES CITED

The following references are of record in the file of this patent:

UNITED STATES PATENTS

| Number | Name | Date |
|---|---|---|
| 2,261,309 | Stuart | Nov. 4, 1941 |
| 1,992,100 | Stein | Feb. 19, 1935 |
| 1,661,740 | Stoekle | Mar. 6, 1928 |
| 1,334,258 | Plaisant | Mar. 16, 1920 |
| 1,891,044 | Dowling | Dec. 13, 1932 |

FOREIGN PATENTS

| Number | Country | Date |
|---|---|---|
| 451,850 | Great Britain | Aug. 10, 1936 |